(12) United States Patent
Hung

(10) Patent No.: US 12,372,140 B1
(45) Date of Patent: Jul. 29, 2025

(54) FORWARD AND REVERSE ROTATION STRUCTURE

(71) Applicant: Jen-Che Hung, Taichung (TW)

(72) Inventor: Jen-Che Hung, Taichung (TW)

( * ) Notice: Subject to any disclaimer, the term of this patent is extended or adjusted under 35 U.S.C. 154(b) by 0 days.

(21) Appl. No.: 18/774,836

(22) Filed: Jul. 16, 2024

(51) Int. Cl.
*F16H 3/00* (2006.01)
*F16D 47/04* (2006.01)

(52) U.S. Cl.
CPC ............. *F16H 3/003* (2013.01); *F16D 47/04* (2013.01)

(58) Field of Classification Search
CPC .................................. F16H 3/003; F16D 47/04
See application file for complete search history.

(56) References Cited

U.S. PATENT DOCUMENTS

| | | | | |
|---|---|---|---|---|
| 503,623 | A | * | 8/1893 | Starr ..................... F16H 31/005 280/267 |
| 840,581 | A | * | 1/1907 | Nelson ................... F16H 25/12 74/126 |
| 2008/0295626 | A1 | * | 12/2008 | Jayasuriya .............. F16H 3/003 74/117 |
| 2023/0228318 | A1 | * | 7/2023 | Coplen .................... F16H 3/10 74/368 |

FOREIGN PATENT DOCUMENTS

| | | | | |
|---|---|---|---|---|
| FR | 1334664 | A | * | 8/1963 |
| FR | 2393988 | A | * | 2/1979 ........... B23Q 16/026 |
| GB | 134199 | A | * | 7/1920 |
| GB | 319607 | A | * | 2/1930 |

* cited by examiner

*Primary Examiner* — William C Joyce
(74) *Attorney, Agent, or Firm* — Chun-Ming Shih; LANWAY IPR SERVICES

(57) ABSTRACT

A forward and reverse rotation structure contains: a gear box which includes a drive shaft coaxially connected with a rotatable wheel. The rotatable wheel includes at least one actuation sheet mounted on an inner wall and an outer wall of the rotatable wheel, at least one spring. The at least one actuation sheet of the inner wall of the rotatable wheel is mounted in a clockwise direction, and the at least one actuation sheet of the outer wall of the rotatable wheel is mounted in a counterclockwise direction. The rotatable wheel also includes a drive wheel, a driven wheel, multiple forward array recesses, an actuated wheel, and an output shaft. The rotatable wheel includes a drive wheel, a driven wheel, multiple reversely array recesses, a direction rotating wheel, and a rotated wheel.

1 Claim, 11 Drawing Sheets

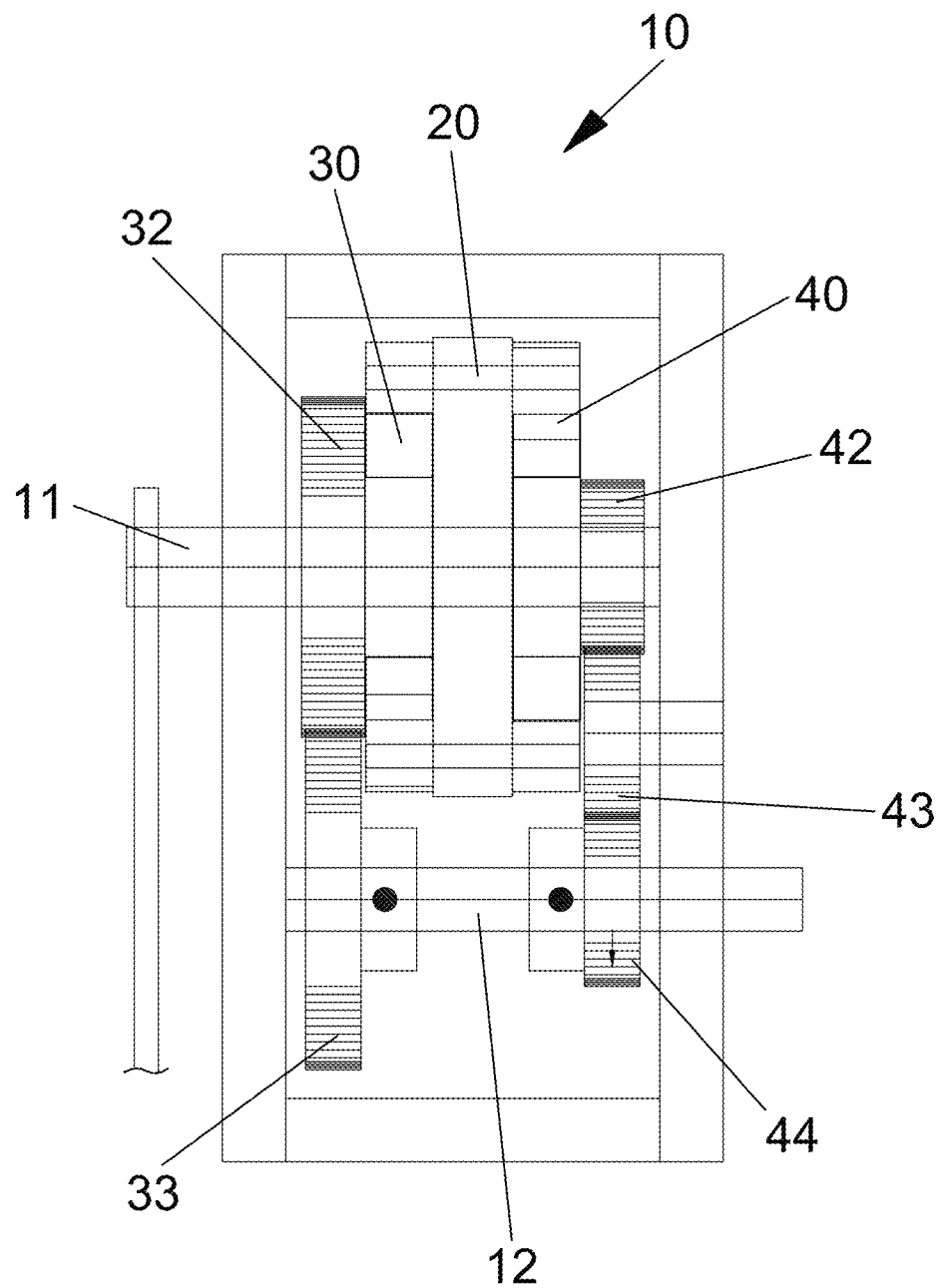
F I G. 1

FORWARD AND REVERSE ROTATION STRUCTURE

TECHNICAL FIELD

The present disclosure relates to a forward and reverse rotation structure by which the at least one gear structure beside the rotatable wheel drives the drive shaft to move forward or reversely to push the output shaft to revolve with the drive shaft.

BACKGROUND

In view of the increasing shortage of oil and increasingly serious air pollution, countries around the world are actively investing in the development and research of alternative energy sources.

The present invention has arisen to mitigate and/or obviate the afore-described disadvantages.

SUMMARY

A primary aspect of the present invention is to provide a forward and reverse rotation structure by which the at least one gear structure beside the rotatable wheel drives the drive shaft to move forward or reversely to push the output shaft to revolve with the drive shaft.

To obtain above-mentioned aspect, a forward and reverse rotation structure provided by the present invention contains: a gear box including a drive shaft extending into the gear box and coaxially connected with a rotatable wheel. The rotatable wheel includes at least one actuation sheet mounted on an inner wall and an outer wall of the rotatable wheel, at least one spring fitted on the at least one actuation sheet and configured to force the at least one actuation sheet to rotate upward and back to an original position. The at least one actuation sheet of the inner wall of the rotatable wheel is mounted in a clockwise direction, and the at least one actuation sheet of the outer wall of the rotatable wheel is mounted in a counterclockwise direction.

The rotatable wheel also includes a drive wheel and a driven wheel connected with the drive wheel, and multiple forward array recesses formed around the rotatable wheel and corresponding to the at least one actuation sheet of the inner wall of the rotatable wheel, an actuated wheel connected with the driven wheel and an output shaft.

The rotatable wheel includes a drive wheel and a driven wheel which are connected together on an outer wall of the rotatable wheel, and multiple reversely array recesses formed around the rotatable wheel and corresponding to the at least one actuation sheet of the inner wall of the rotatable wheel, an direction rotating wheel connected with the driven wheel and a rotated wheel, and the rotated wheel is connected with an output shaft.

Other objects and features will be in part apparent and in part pointed out hereinafter.

BRIEF DESCRIPTION OF THE DRAWINGS

FIG. 1 is a perspective view showing the assembly of a forward and reverse rotation structure according to a preferred embodiment of the present invention.

DETAILED DESCRIPTION

Figure 2:
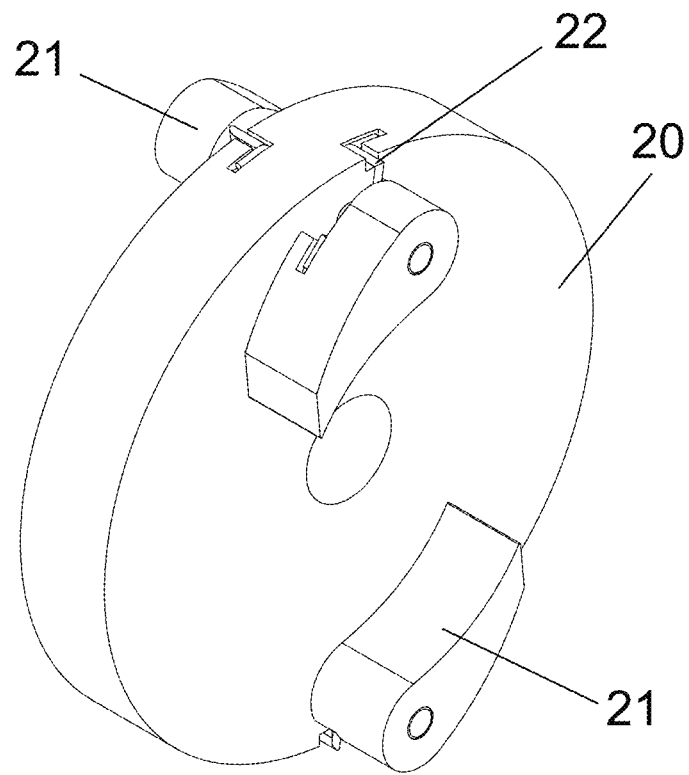
FIG. 2 is a perspective view showing the assembly of a part of the forward and reverse rotation structure according to the preferred embodiment of the present invention.
Figure 3:
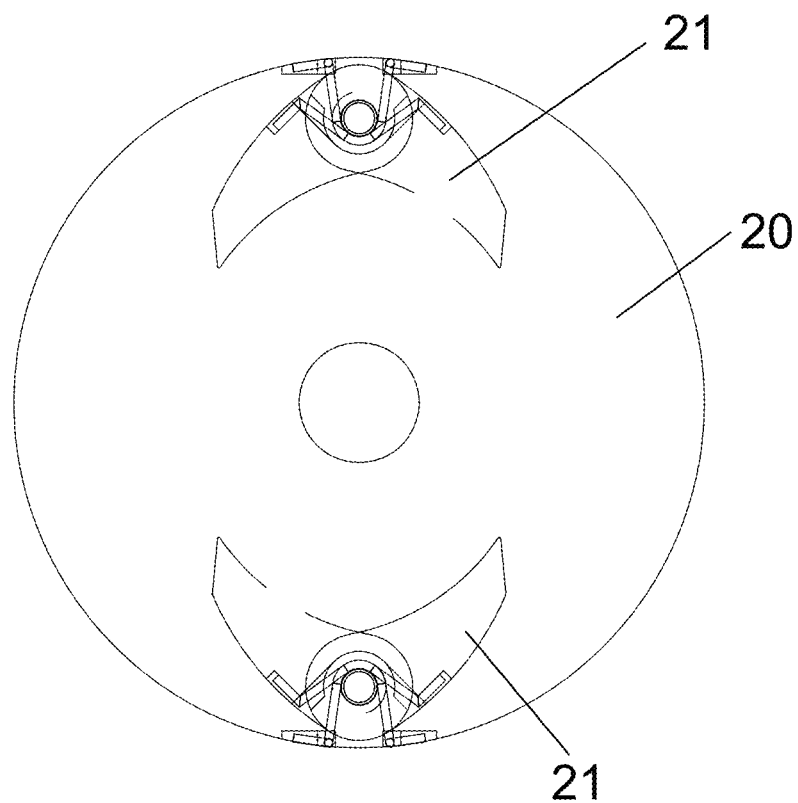
FIG. 3 is a side plan view showing the assembly of a part of the forward and reverse rotation structure according to the preferred embodiment of the present invention.
Figure 4:
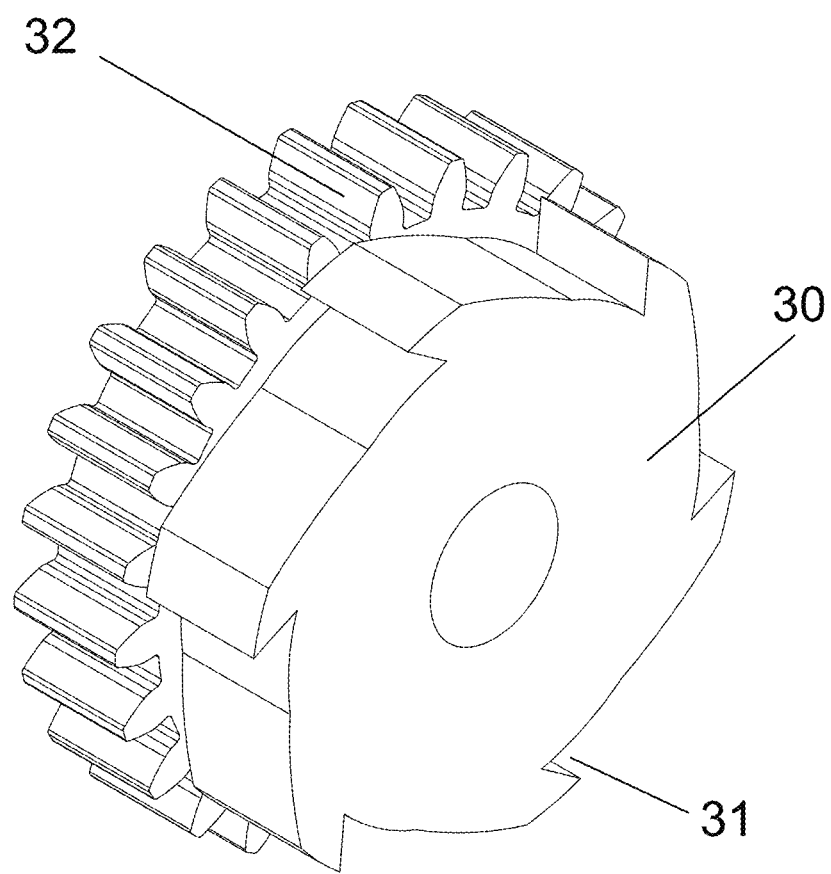
FIG. 4 is a perspective view showing the assembly of another part of the forward and reverse rotation structure according to the preferred embodiment of the present invention.
Figure 5:
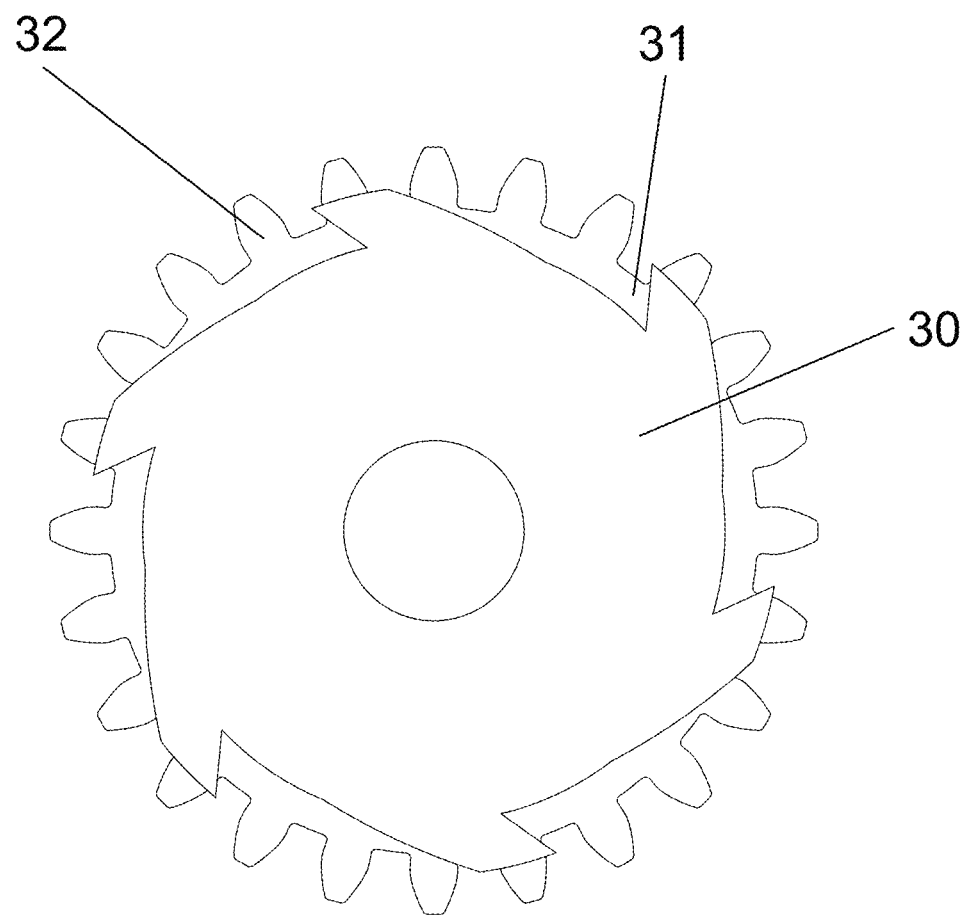
FIG. 5 is a side plan view showing the assembly of another part of the forward and reverse rotation structure according to the preferred embodiment of the present invention.
Figure 6:
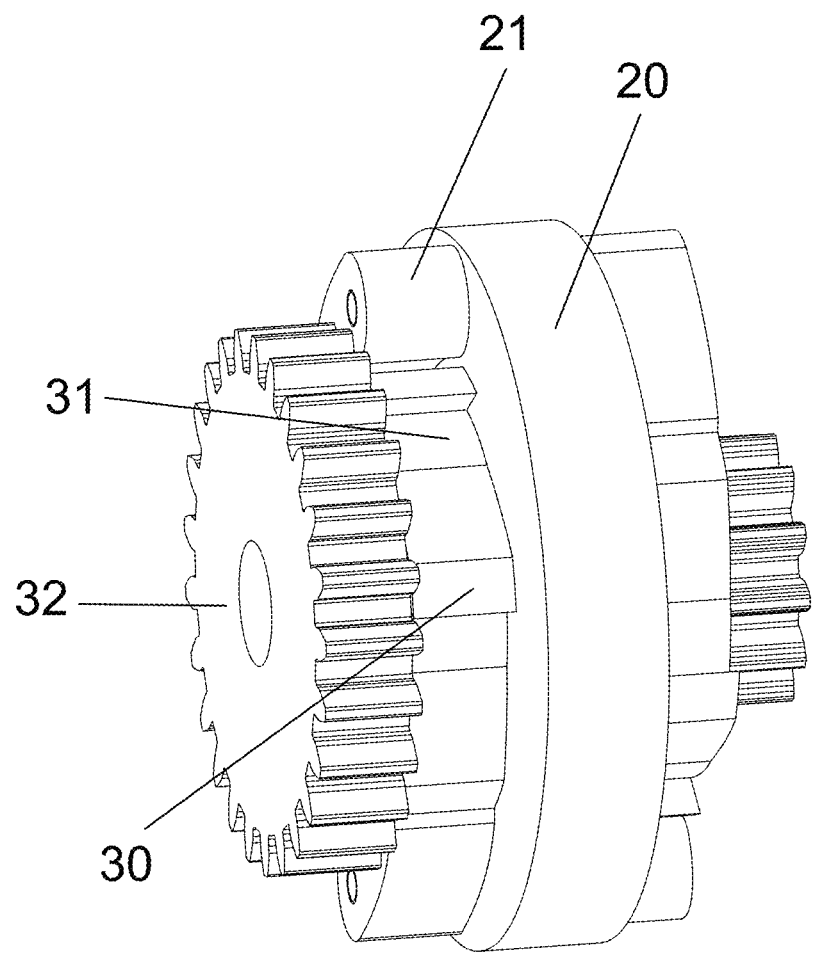
FIG. 6 is a perspective view showing the assembly of another part of the forward and reverse rotation structure according to the preferred embodiment of the present invention.
Figure 7:
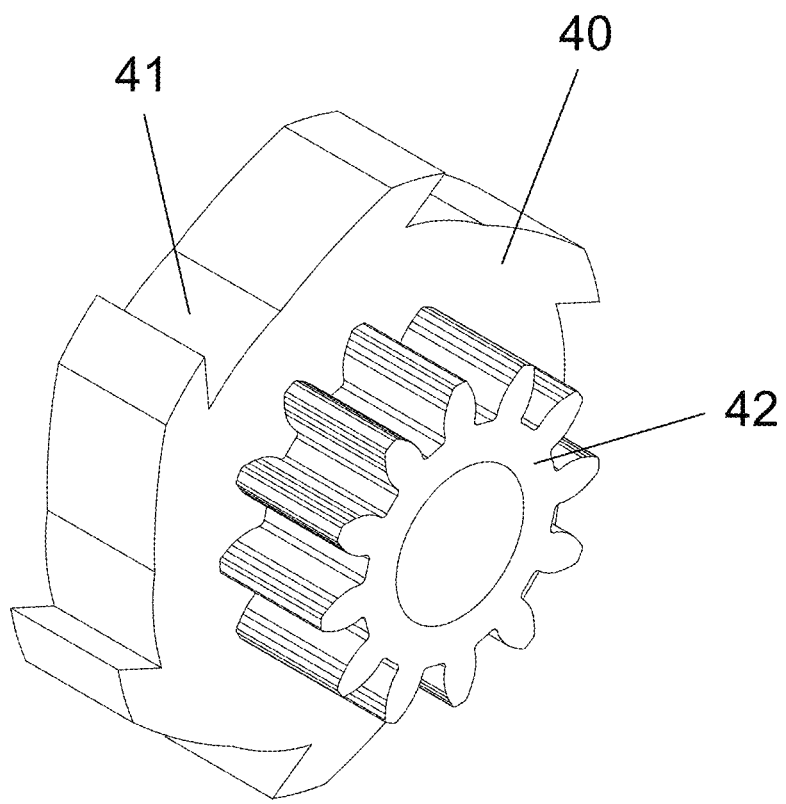
FIG. 7 is a perspective view showing the assembly of another part of the forward and reverse rotation structure according to the preferred embodiment of the present invention.
Figure 8:
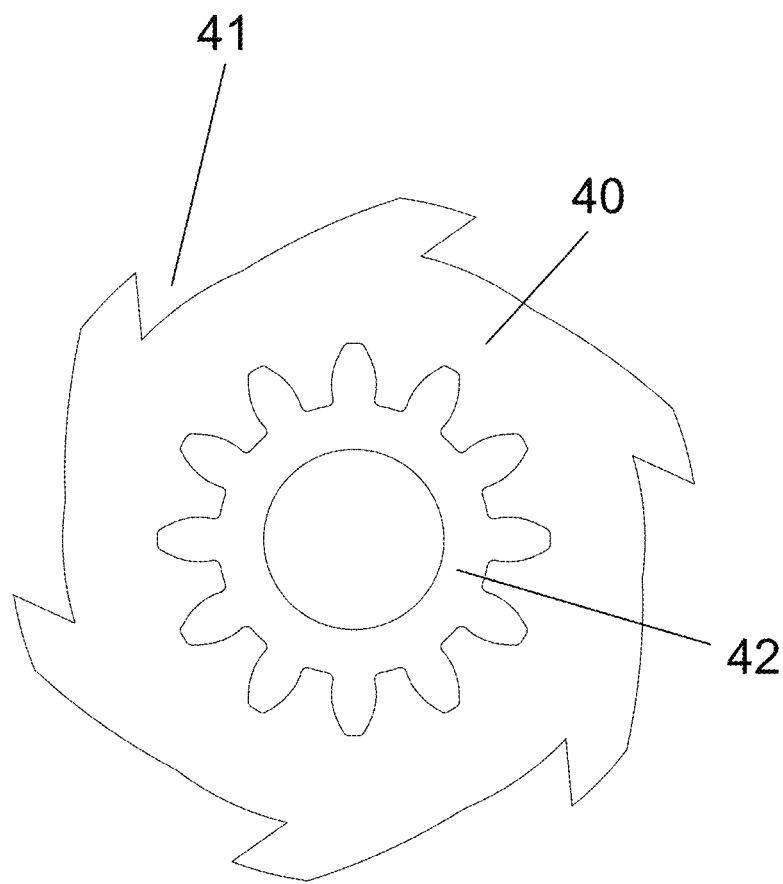
FIG. 8 is a side plan view showing the assembly of another part of the forward and reverse rotation structure according to the preferred embodiment of the present invention.
Figure 9:
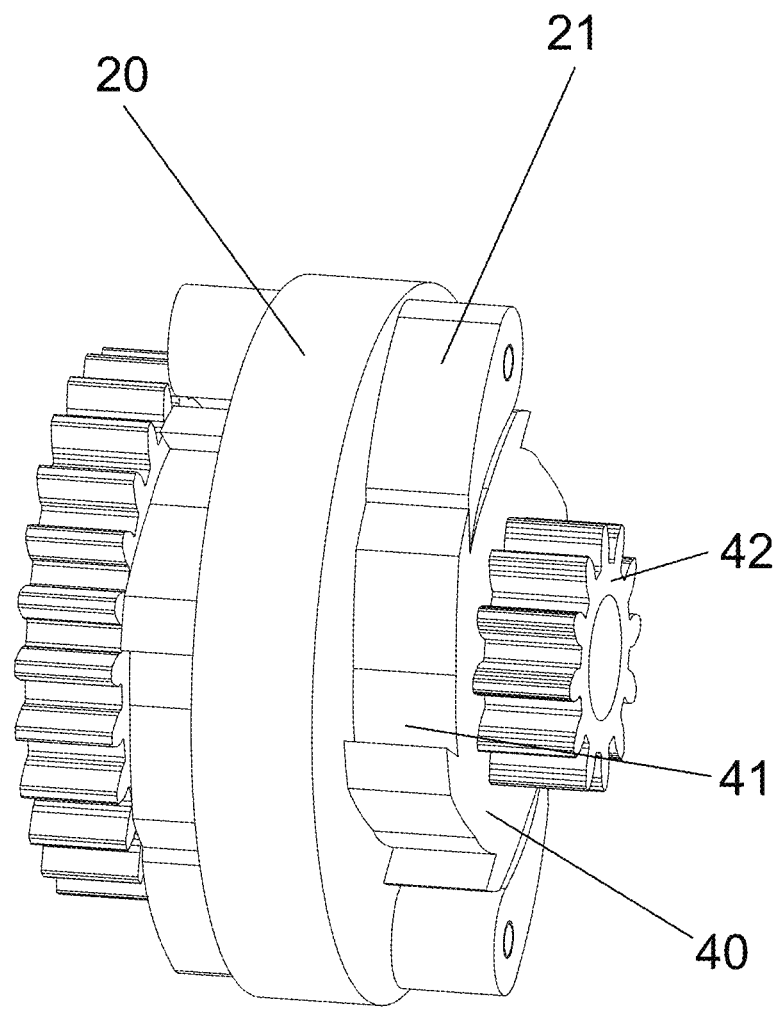
FIG. 9 is a perspective view showing the operation of the forward and reverse rotation structure according to the preferred embodiment of the present invention.

With reference to FIGS. 1-3, a forward and reverse rotation structure according to a preferred embodiment of the present invention comprises: a gear box 10, and the gear box 10 includes a drive shaft 11 extending into the gear box 10 and coaxially connected with a rotatable wheel 20. The rotatable wheel 20 includes at least one actuation sheet 21 mounted on an inner wall and an outer wall of the rotatable wheel 20, at least one spring 22 fitted on the at least one actuation sheet 21 and configured to force the at least one actuation sheet 21 to rotate upward and back to an original position, wherein the at least one actuation sheet 21 of the inner wall of the rotatable wheel 20 is mounted in a clockwise direction, and the at least one actuation sheet 21 of the outer wall of the rotatable wheel 20 is mounted in a counterclockwise direction.

Referring to FIGS. 1 and 4-6, the rotatable wheel 20 also includes a drive wheel 30 and a driven wheel 32 connected with the drive wheel 30, and multiple forward array recesses 31 formed around the rotatable wheel 30 and corresponding to the at least one actuation sheet 21 of the inner wall of the rotatable wheel 20, an actuated wheel 33 connected with the driven wheel 32 and an output shaft 12.

As shown in FIGS. 1 and 7-9, the rotatable wheel 20 includes a drive wheel 40 and a driven wheel 42 which are connected together on an outer wall of the rotatable wheel 20, and multiple reversely array recesses 41 formed around the rotatable wheel 40 and corresponding to the at least one actuation sheet 21 of the inner wall of the rotatable wheel 20, an direction rotating wheel 43 connected with the driven wheel 42 and a rotated wheel 44, and the rotated wheel 44 is connected with an output shaft 12.

Figure 10:
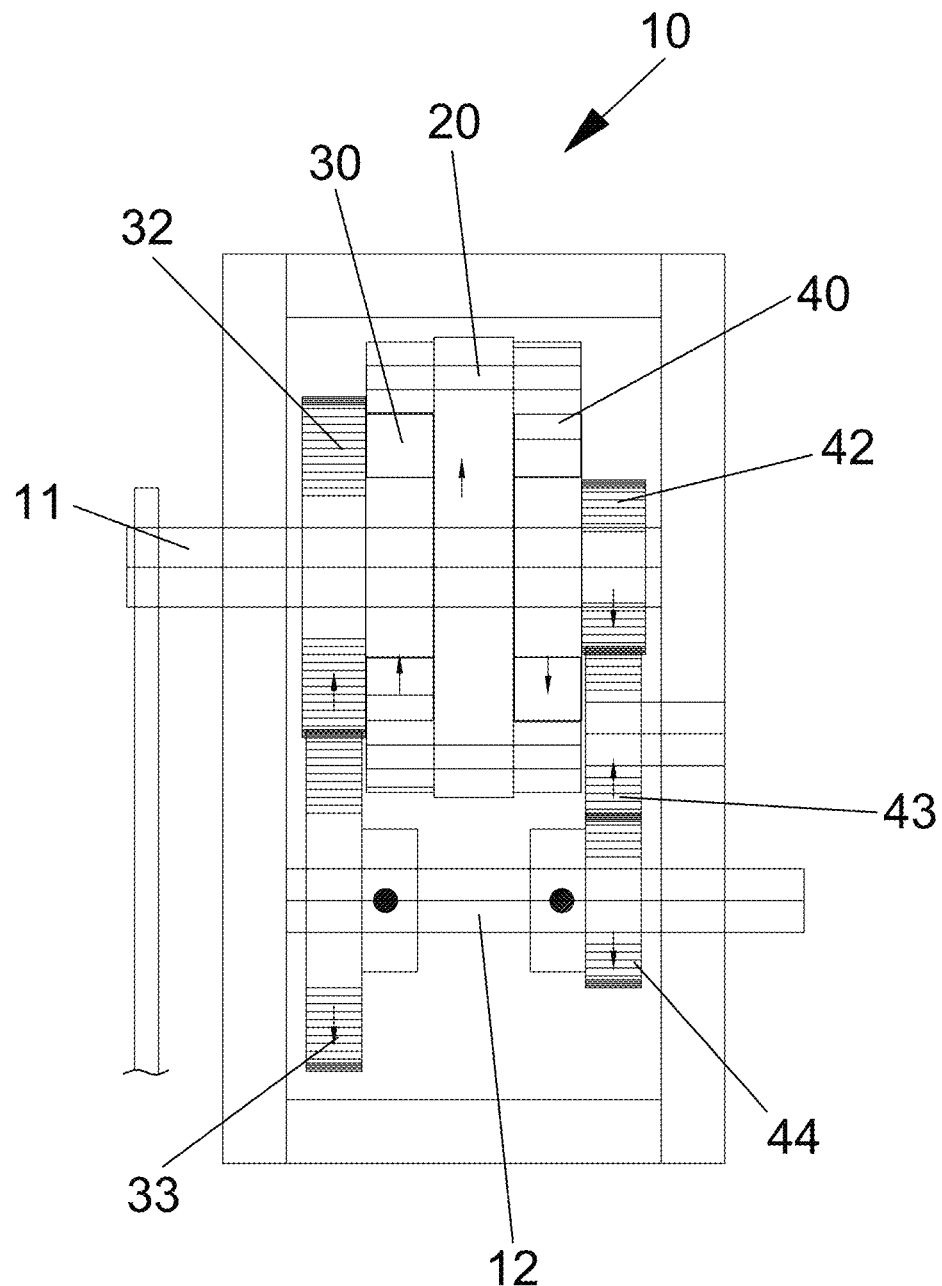
FIG. 10 is a schematic view showing the operation of the forward and reverse rotation structure according to the preferred embodiment of the present invention.
Figure 11:
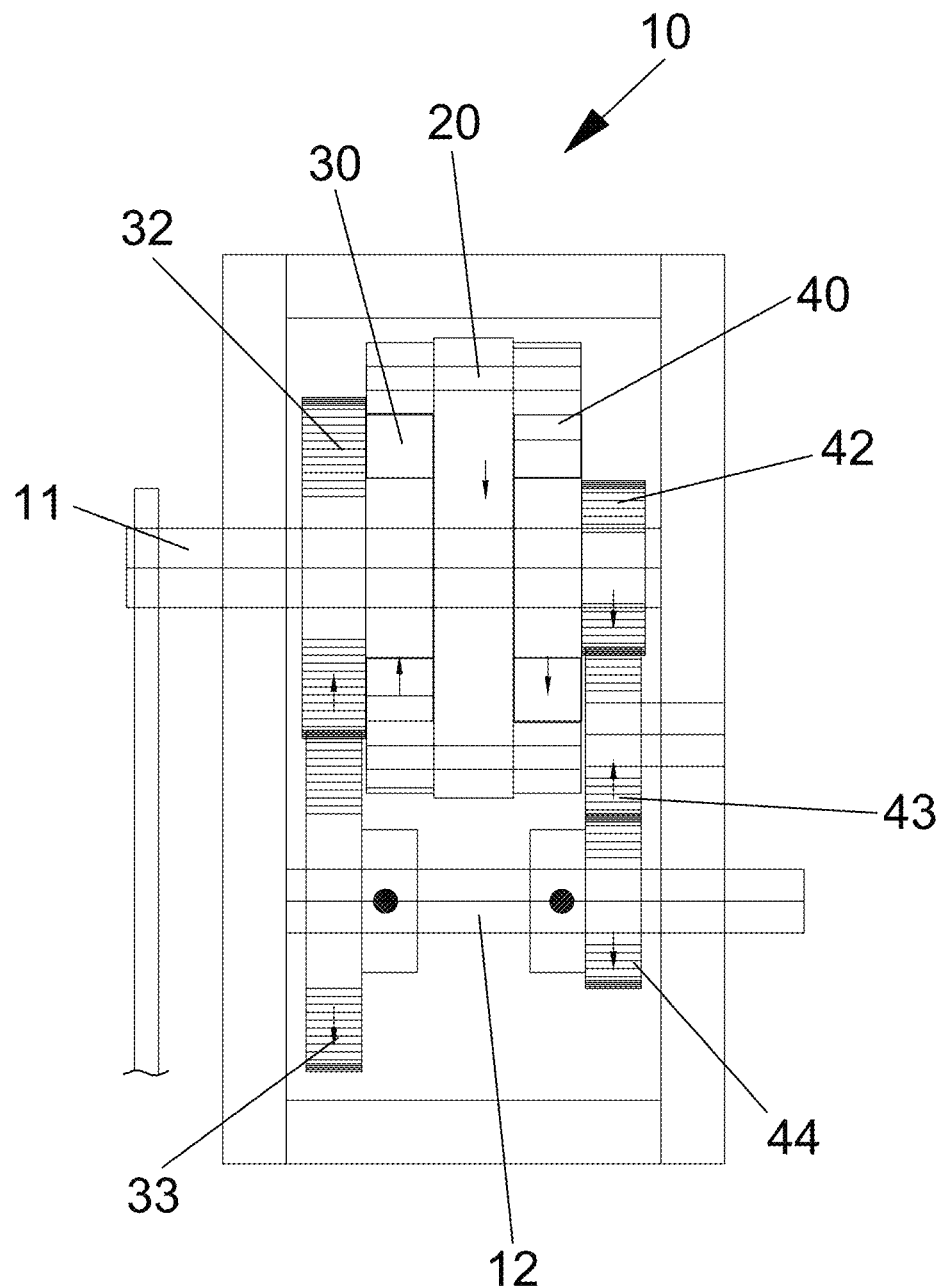
FIG. 11 is another schematic view showing the operation of the forward and reverse rotation structure according to the preferred embodiment of the present invention.

As shown in FIGS. 10 and 11, when the rotatable wheel 20 rotated in the clockwise direction, the at least one actuation sheet 21 of the inner wall of the rotatable wheel 20 is engaged in the multiple forward array recesses 31 to actuate the drive wheel 30 and the driven wheel 32 to rotate clockwisely, and the actuated wheel 33, the output shaft 12 and the rotated wheel 44 revolve counterclockwise, the direction rotating wheel 43 rotates clockwisely, the driven wheel 42 and the drive wheel 40 revolve counterclockwise. Since the rotatable wheel 20 rotates in a clockwise direction, the at least one actuation sheet 21 of the outer wall of the rotatable wheel 20 is moved outsides the multiple reversely array recesses 41 of the drive wheel 40. On the contrary, when the rotatable wheel 20 rotates in a counterclockwise direction, the at least one actuation sheet 21 of the outer wall of the rotatable wheel 20 is engaged in the multiple reversely array recesses 41 of the drive wheel 40 to actuate the drive wheel 40 and the driven wheel 42 to revolve counterclockwise, the direction rotating wheel 43 rotates clockwisely, the rotated wheel 44, the output shaft 12 and the actuated wheel 33 revolve counterclockwise, and the driven wheel 32 and the drive wheel 30 rotate clockwise. In the meantime, the rotatable wheel 20 rotates counterclockwise, so the at least one actuation sheet 21 of the inner wall of the rotatable wheel 20 is moved outsides the multiple forward array recesses 31.

Therefore, the at least one gear structure beside the rotatable wheel 20 drives the drive shaft 11 to move forward or reversely to push the output shaft 12 to revolve with the drive shaft 11.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A forward and reverse rotation structure comprising:
a gear box including a drive shaft extending into the gear box and coaxially connected with a rotatable wheel, wherein the rotatable wheel includes at least one actuation sheet pivotally mounted on an inner wall and an outer wall of the rotatable wheel, at least one spring fitted on the at least one actuation sheet and configured to force the at least one actuation sheet to rotate upward and back to an original position, wherein the at least one actuation sheet of the inner wall of the rotatable wheel is mounted in a clockwise direction, and the at least one actuation sheet of the outer wall of the rotatable wheel is mounted in a counterclockwise direction;

wherein the rotatable wheel also includes a drive wheel and a driven wheel connected with the drive wheel, and multiple forward array recesses formed around the rotatable wheel and corresponding to the at least one actuation sheet of the inner wall of the rotatable wheel, an actuated wheel connected with the driven wheel and an output shaft;

wherein the rotatable wheel includes a drive wheel and a driven wheel which are connected together on an outer wall of the rotatable wheel, and multiple reversely array recesses formed around the rotatable wheel and corresponding to the at least one actuation sheet of the outer wall of the rotatable wheel, an direction rotating wheel connected with the driven wheel and a rotated wheel, and the rotated wheel is connected with the output shaft;

wherein when the rotatable wheel rotates in the clockwise direction, the at least one actuation sheet of the inner wall of the rotatable wheel is engaged in the multiple forward array recesses to actuate the drive wheel and the driven wheel to rotate clockwise, and the actuated wheel, the output shaft and the rotated wheel revolve counterclockwise, the direction rotating wheel rotates clockwise, the driven wheel and the drive wheel revolve counterclockwise;

wherein the rotatable wheel rotates in a clockwise direction, the at least one actuation sheet of the outer wall of the rotatable wheel is removed from the multiple reversely array recesses of the drive wheel;

wherein when the rotatable wheel rotates in a counterclockwise direction, the at least one actuation sheet of the outer wall of the rotatable wheel is engaged in the multiple reversely array recesses of the drive wheel to actuate the drive wheel and the driven wheel to revolve counterclockwise, the direction rotating wheel rotates clockwise, the rotated wheel, the output shaft and the actuated wheel revolve counterclockwise, and the driven wheel and the drive wheel rotate clockwise, and the rotatable wheel rotates counterclockwise, so the at least one actuation sheet of the inner wall of the rotatable wheel is removed from the multiple forward array recesses.

\* \* \* \* \*